United States Patent [19]

Jekot et al.

[11] Patent Number: 4,862,499
[45] Date of Patent: Aug. 29, 1989

[54] DEFORMABLE MEMBRANE KEYPAD ASSEMBLY FOR PUBLIC TELEPHONES

[75] Inventors: David E. Jekot, Cumming, Ga.; Harold W. Jordan, Homosassa, Fla.

[73] Assignee: Phillips & Brooks, Inc., Cumming, Ga.

[21] Appl. No.: 93,045

[22] Filed: Sep. 4, 1987

[51] Int. Cl.⁴ ............................................. H01H 3/32
[52] U.S. Cl. ............................ 379/368; 379/437; 379/451; 200/5 A
[58] Field of Search ............ 379/368, 369, 370, 367, 379/364, 437, 362, 451; 200/5 A, 5 R; 340/365 R, 365 C, 365 L, 365 A, 365 E, 365 P, 365 S; 341/22, 34

[56] References Cited

U.S. PATENT DOCUMENTS

| | | | |
|---|---|---|---|
| 4,291,201 | 9/1981 | Johnson et al. | 379/368 |
| 4,524,249 | 6/1985 | Farrell | 200/5 A |
| 4,609,791 | 9/1986 | Abbat | 200/5 A |
| 4,618,744 | 10/1986 | Pope et al. | 200/5 A |
| 4,636,593 | 1/1987 | Norak et al. | 200/5 A |
| 4,687,200 | 8/1987 | Shirai | 273/148 B |
| 4,710,597 | 12/1987 | Loheac | 200/5 A |
| 4,716,262 | 12/1987 | Morse | 200/5 A |
| 4,760,217 | 7/1988 | Suzuki et al. | 200/5 A |

Primary Examiner—Jin F. Ng
Assistant Examiner—Randall S. Vaas
Attorney, Agent, or Firm—Jones, Askew & Lunsford

[57] ABSTRACT

A telephone keypad assembly including a one-piece deformable membrane for sealing the keypad assembly from the environment. The deformable membrane has an upper surface for mating with keypad pushbuttons and a keypad pushbutton housing unit, and a lower surface including a contact actuator for making contact with electrical switch contacts. The membrane forms raised areas or domes which bias the keypad pushbuttons and biasingly resists movement of the contact actuator toward the electrical contacts. The keypad assembly including switch contacts is protected from moisture, dust and other corrosive elements by the seal formed between the housing unit and the deformable membrane.

7 Claims, 3 Drawing Sheets

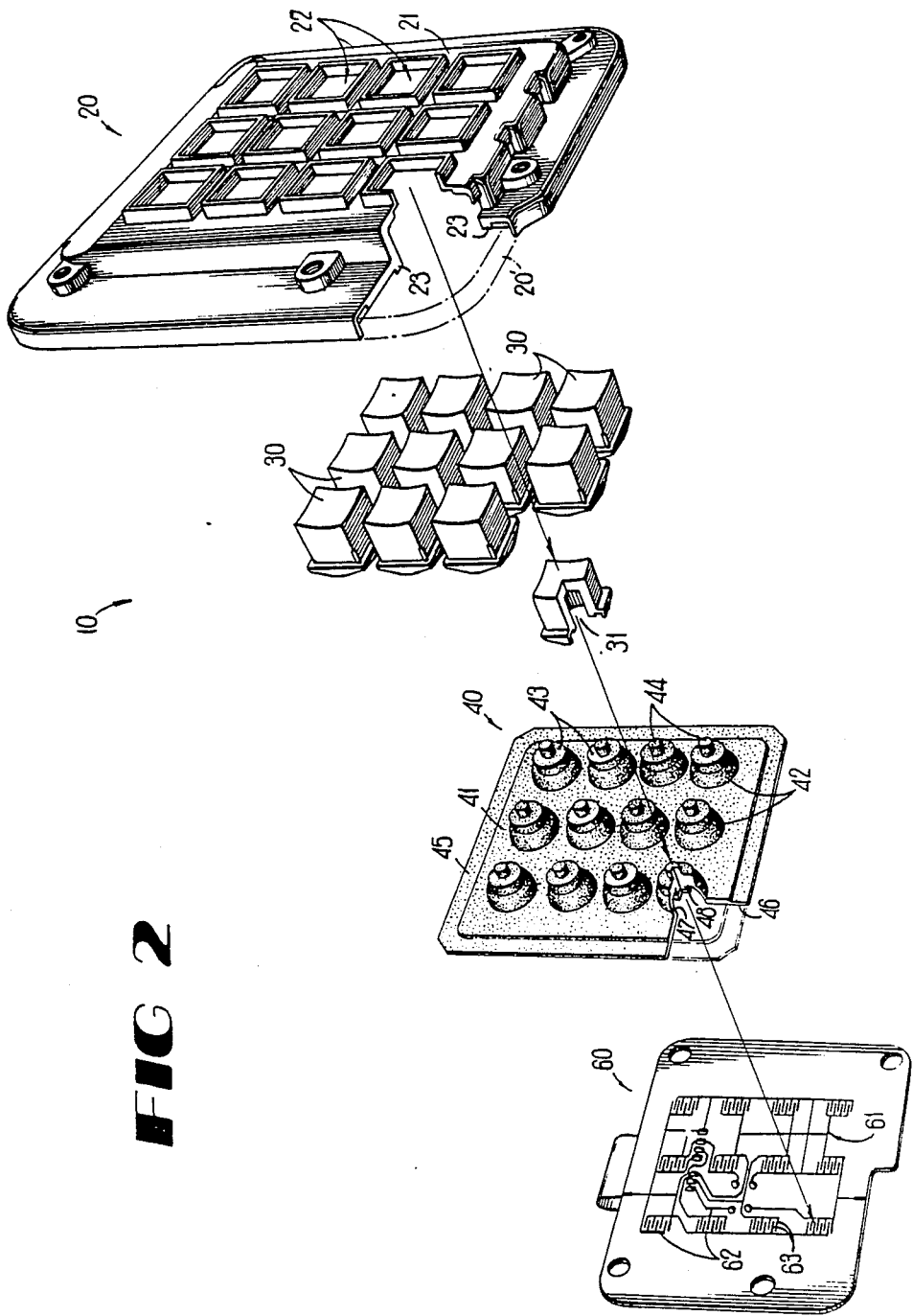

DEFORMABLE MEMBRANE KEYPAD ASSEMBLY FOR PUBLIC TELEPHONES

TECHNICAL FIELD

This invention relates generally to pay telephones, and more particularly relates to a pay telephone keypad assembly having a deformable membrane for sealing the keypad assembly from the environment.

BACKGROUND OF THE INVENTION

Public telephones suffer from exposure to the elements and from an environment which is often laden with dust, chemicals and corrosive agents. In addition, public telephones are frequently the objects of vandalism, or through negligence, have food and/or beverages spilled upon them. The telephone keypad assembly is the recipient of much of the abuse inasmuch as it is among the most readily accesible parts of the telephone.

Moisture, dust or other corrosive elements may seep into the keypad assembly and cause the mechanism of the unit to foul up or to short the delicate electrical connections. Such interference may cause the keypad assembly to malfunction, making cleaning or replacement necessary. In some telephones, the telephone unit has to be disassembled in order to obtain access for cleaning or replacement.

Further, the touch of keypad pushbuttons in a public telephone may be affected by the damage caused by the elements or by vandalism. A proper touch is important because it serves to assure users that the telephone is in proper working order. Generally, the public is most comfortable with a resilient tactile feel to the keypad upon selective depression of the pushbuttons.

Accordingly, there is a need for a simple, inexpensive and rugged device which is easy to manufacture, install or replace, which would protect the keypad assembly from the hazards of its environment, and which would retain a resilient keypad pushbutton touch.

SUMMARY OF THE INVENTION

As will be seen, the present invention satisfies the foregoing criteria. Stated generally, the present invention comprises a telephone keypad assembly including keypad pushbuttons supported by a keypad pushbutton housing unit, a deformable membrane selflocated inside the housing unit, and electrical contact means mounted below the deformable membrane.

Stated more specifically, the present invention comprises a plurality of keypad pushbuttons, each of which has a recess on the back side of it, and a keypad pushbutton housing unit, which has a plurality of openings to support the keypad pushbuttons. Around the periphery of the region of the supportive openings, the housing unit has a sealing surface for mating with the deformable membrane.

The deformable membrane is positioned behind the keypad pushbuttons and housing unit, and is made from a resilient and durable material such as silicone or the like. The membrane provides the spring action for the keypad pushbuttons. Advantageously, the deformable membrane is of one piece construction, which makes it easy to manufacture, install or replace, and which does not allow for damaging substances to pass through it to the electrical contact means. The resilient nature of the material also provides a comfortable springiness to the touch of the keypad pushbuttons. Utilization of the deformable membrane of the present invention eliminates the necessity of using a conventional dust membrane in the keypad assembly.

The deformable membrane of the present invention has an upper surface designed for mating with the keypad pushbuttons and with the sealing surface of the keypad pushbutton housing unit. The deformable membrane also has a lower surface for making contact with the electrical contact means.

Integrally formed on the upper side of the deformable membrane and corresponding to the number of keypad pushbuttons are a plurality of raised areas or domes with collars disposed on top of each of the raised areas. An alignment protrusion extends from each raised area and collar, and is positioned to mate with the recess on the backside of a keypad pushbutton. In addition to self-locating the deformable membrane behind the keypad pushbuttons and over the electrical contact means, the alignment protrusions eliminate any side to side movement of the deformable membrane which may cause the keypad assembly to fail because of non-functioning electrical contacts.

The upper surface of the deformable membrane also includes an integrally-formed, stepped peripheral edge which is thinner than the rest of the deformable membrane and which is designed for mating with the sealing surface of the housing unit. The seal formed as a result of the deformable membrane's peripheral edge mating with the housing unit's sealing surface protects the electrical contact means from moisture, dust and other corrosive elements.

The lower surface of the deformable membrane includes a plurality of integrally formed well areas corresponding to the number of raised areas or domes in the upper surface. Set within each well area is a contact actuator which has an electrically conductive contact disposed at its distal end for completing an electrical circuit with the electrical contact means. The lower surface also includes a plurality of grooves, each of which connects at least two adjacent well areas to prevent the contact actuator from creating a vacuum and adhering to the electrical contact means.

In the preferred embodiment, the electrical contact means comprises a matrix printed circuit board with a plurality of contact pads disposed thereon, each pad having interleaved contactors.

The biasing means for urging each of said contact actuators toward the keypad pushbuttons is integrally formed by the raised areas of said deformable membrane. In response to selective depression of the keypad pushbuttons, the biasing action of the membrane allows the contact actuators to make contact with electrical contact means mounted below the deformable membrane and to complete a plurality of electric circuits. Advantageously, the onepiece biasing means protects the underlying electrical contact means from exposure to substances which may seep into the keypad housing unit, but which are blocked from further penetration by the deformable membrane.

Accordingly, it is an object of the present invention to provide an environmentally sealed telephone keypad assembly.

It is another object of the present invention to provide a telephone keypad assembly in which a deformable membrane protects the interior of the assembly from damaging substances.

It is another object of the present invention to provide a telephone keypad assembly wherein the keypad pushbuttons retain a resilient touch upon depression.

It is another object of the present invention to provide a more rugged environmentally sealed keypad assembly than is provided by conventional keypad assemblies.

It is another object of the present invention to provide an environmentally sealed telephone keypad assembly which may be employed in existing pay telephones without significant modification or change of the components in existing telephones.

It is another object of the present invention to provide a deformable membrane which is of durable yet resilient one piece construction, and which is easy to manufacture, install or replace.

These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 2 is a perspective exploded view of a telephone keypad assembly constructed in accordance with the preferred embodiment of the present invention.

DETAILED DESCRIPTION OF THE PREFERRED EMBODIMENT

Figure 1:
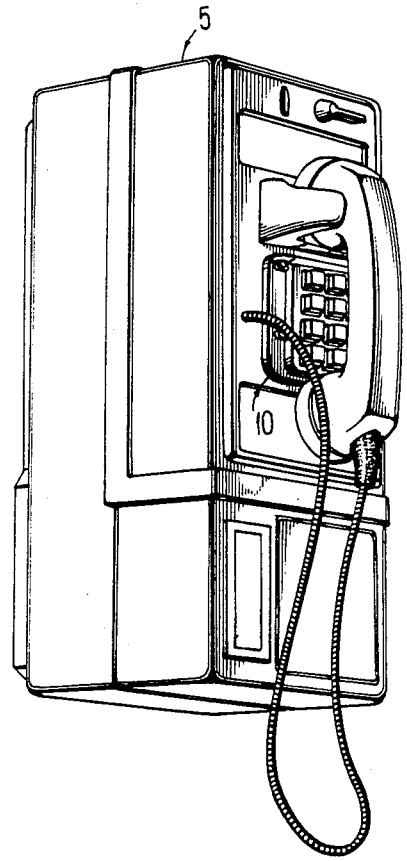
FIG. 1 is a perspective view of a conventional pay telephone employing the telephone keypad assembly of the present invention.

Referring now to the drawings, in which like numerals indicate like elements throughout the several figures, FIG. 1 illustrates a coin operated telephone 5 employing a preferred embodiment of a telephone keypad assembly 10 constructed in accordance with the present invention. The preferred keypad assembly 10 is particularly suited for use in a Western Electric 70 A/B Touch Tone ® dial, but only the metal buttons and chrome housing of this dial are employed.

In FIG. 2, there is illustrated a perspective exploded view of the preferred telephone keypad assembly 10. The keypad assembly 10 comprises a keypad pushbutton housing unit 20, a plurality of keypad pushbuttons 30, a deformable membrane 40, and electrical contact means 60. The keypad pushbutton housing unit 20 is a conventional housing unit commonly used in conjunction with public coin-operated touch-tone telephones. The housing unit 20 has a region 21 including a plurality of openings 22 to support the keypad pushbuttons 30. A corner of the housing unit 20 has been cut away and is shown in phantom 20' in order to expose the sealing surface 23 which extends peripherally around the backside of the openings region 21. The sealing surface 23 of the housing unit 20 mates with peripheral edge 45 of the deformable membrane 40.

Figure 3:
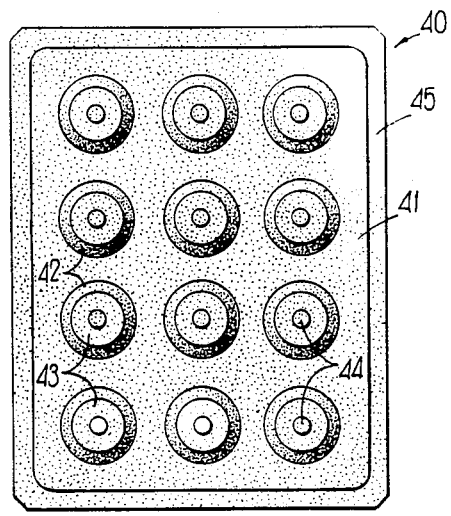
FIG. 3 is a top view of the deformable membrane of the preferred embodiment of the present invention.

As further illustrated in FIGS. 2 and 3, the keypad pushbuttons 30 of the preferred embodiment of the present invention are conventional keypad pushbuttons commonly used in conjunction with public coin-operated touch-tone telephones. As shown in the cut-away view of one of the keypad pushbuttons 30 (FIG. 6), each keypad pushbutton 30 has a recess 31 in its backside for mating with the deformable membrane 40.

Figure 5:
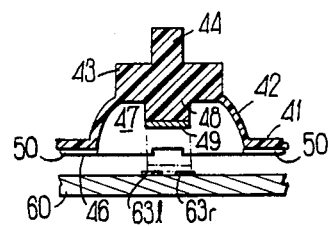
FIG. 5 is a cut-away side view of one of the raised areas of the deformable membrane constructed in accordance with the preferred embodiment of the present invention.

The upper surface 41 of the deformable membrane 40 is also illustrated in FIG. 2 with a corner of the deformable membrane 40 cut away and shown in phantom 40' so as to expose the well area 47 and the contact actuator 48 disposed on the lower surface 46. This is best seen in FIG. 5. The upper surface 41 includes an integrally formed peripheral edge 45 for mating with the sealing surface 23 of the housing unit 20. The deformable membrane 40 is best shown and further described in FIGS. 3 and 4.

FIG. 2 also illustrates the electric contact means 60 which, in the preferred embodiment of the present invention, is a matrix printed circuit board 60. The printed circuit board 60 is of a conventional printed circuit board type, having imprinted thereupon a plurality of leads 61 including a plurality of foil contact pads 62, each pad having interleaved foil contacts 63 for completing a plurality of electric circuits upon selective depression of the keypad pushbuttons 30. In particular, the foil contacts such as 63l, 63r (FIG. 5) are arranged so as to complete an electrical circuit when a conducting element bridges the gap between the contacts.

FIG. 3 illustrates the upper surface 41 of the preferred deformable membrane 40 constructed in accordance with the present invention. Integrally formed on the upper surface 41 are a plurality of raised areas 42 shaped as domes or truncated hemispheres with circular flat-topped integral collars 43 disposed on each dome 42. An alignment protrusion 44 extends from each dome 42 and collar 43, and is positioned to mate with the recess 31 on the back of the keypad pushbutton 30. The upper surface 41 also includes an integrally formed peripheral edge 45 for mating with the sealing surface 23 of the housing unit 20.

Figure 4:
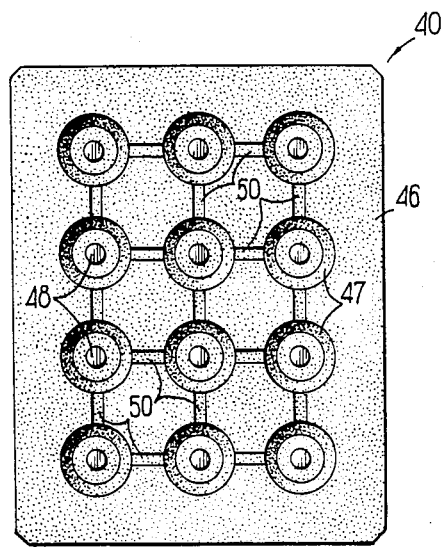
FIG. 4 is a bottom view of the deformable membrane of the preferred embodiment of the present invention.

FIG. 4 illustrates the lower surface 46 of the deformable membrane 40. The lower surface 46 includes a plurality of integrally formed well areas 47 corresponding to the number of raised areas 42 on the upper surface 41. Set within each well area 47 is a contact actuator 48 which completes an electric circuit by contacting a contact pad 62 disposed on the printed circuit board 60. The lower surface 46 also includes a plurality of grooves 50, each of which connects at least two adjacent well areas 47.

FIG. 5 illustrates a cut-away side view of one of the raised areas 42 of the deformable membrane 40 constructed in accordance with the preferred embodiment of the present invention. As can be seen in FIG. 5, a circular flat-topped integral collar 43 is disposed on the dome 42. A cylindrically-shaped integrally-formed alignment protrusion 44 extends from the dome 42 and collar 43. The corresponding well area 47 has a contact actuator 48 disposed therein, which has an electrically conductive contact 49 disposed at its distal end. Illustrated in phantom is the position assumed by the contact actuator 48 upon selective depression of its corresponding keypad pushbutton 30 in completing an electric circuit by making contact with its corresponding contacts 63l, 63r of a contacts pad 62 disposed on the printed circuit board 60.

Figure 6:
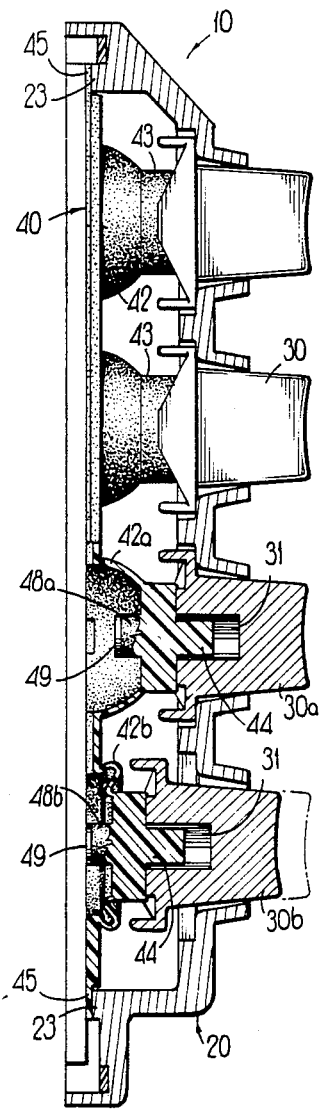
FIG. 6 is a cut-away side view of the telephone keypad assembly shown in FIG. 2.

FIG. 6 illustrates a cut-away side view of the telephone keypad assembly of the preferred embodiment of the present invention shown in FIG. 2. Keypad pushbutton 30a is shown in its resting position with a cut-away view which illustrates the mating of the alignment protrusion 44 with the recess 31 in the keypad pushbutton 30, the resting position of the raised area 42a, and the resting position of the contact actuator 48a. Keypad pushbutton 30b is shown in its depressed position with its resting position 30' drawn in phantom. The cut-away view of keypad pushbutton 30b illustrates the contact actuator 48b completing an electric circuit by making contact with its corresponding contact pad 62b. The cut-away view of keypad pushbutton 30b also illustrates the folded position assumed by the raised area 42b upon depression of the keypad pushbutton 30b.

The preferred embodiment of the present invention has been disclosed by way of example and it will be understood that other modifications may occur to those skilled in the art without departing from the scope and the spirit of the appended claims.

What is claimed is:

1. In a telephone keypad assembly comprising a plurality of keypad pushbuttons, each of said pushbuttons including a cylindrical recess on an ainterior facing side, each of said pushbuttons including an annular surface positioned coaxially with said cylindrical recess, a housing unit with an openings region comprising a plurality of openings for osupport of individual ones of said keypad pushbuttons and including a sealing surface around a periphery of said openings region, and electrical contacts forming a part of a telephone electrical circuit in response to selective depression of one of said keypad pushbuttons, an improved sealing and circuit actuation membrane, comprising:

an upper surface for mating with said interior facing side of said keypad pushbuttons and said sealing of said housing unit, and a lower surface;

said upper surface defining a plurality of raised areas and including a peripheral edge portion for mating with said sealing surface of said housing unit;

each of said raised areas defining a dome, a cylindrical collar disposed on top of said dome for mating with said annular surface of said pushbuttons, and a cylindrical alignment protrusion extending from said cylindrical collar for mating with said cylindrical recesses in said pushbuttons;

said lower surface defining a plurality of well areas corresponding to said plurality of raised areas in said upper surface;

each of said well areas including a contact actuator extending perpendicularly to said lower surface;

each of said contact actuators having an electrically conductive material disposed at the distal end thereof for contacting said electrical contacts for completing said telephone electrical circuit when said pushbuttons are depressed; and said well areas and said raised areas forming biasing means for urging each of said raised areas away from said electrical contacts when said pushbuttons are released.

2. The membrane of claim 1, wherein the radius of said cylindrical collars is greater than the radius of said alignment protrusions.

3. A membrane as recited in claim 1, wherein said deformable membrane is formed from silicone.

4. A membrane is recited in claim 1, wherein said alignment protrusions, said biasing means, said contact actuators, and said peripheral edge portion are formed from a single molded piece of silicone.

5. A membrane as recited in claim 1, wherein said peripheral edge portion of said upper surface is thinner than the rest of said membrane for mating with said sealing surface of said housing unit.

6. A membrane as recited in claim 1, wherein each of said contact actuators has an electrically conductive layer of carbon disposed at the distal end of each of said contact actuators.

7. A membrane as recited in claim 1, further comprising a plurality of grooves disposed on said lower surface, each of said grooves connecting at least two adjacent well areas in order to prevent said contact actuators from adhering to said electrical contacts.

* * * * *